Aug. 7, 1951  D. G. C. LUCK ET AL  2,563,123
COUNTER CIRCUIT
Filed Feb. 24, 1950
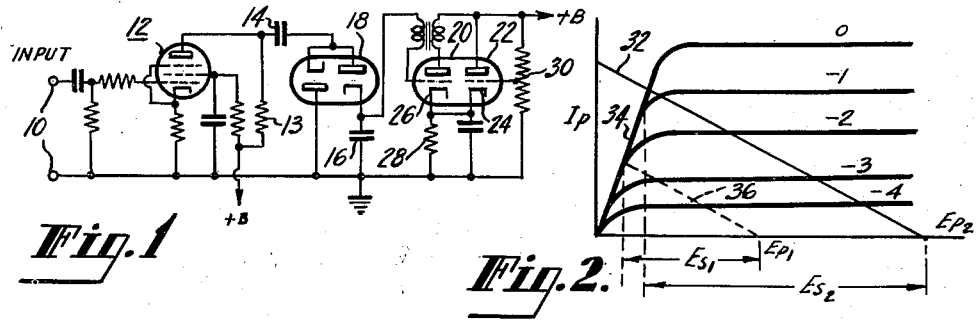
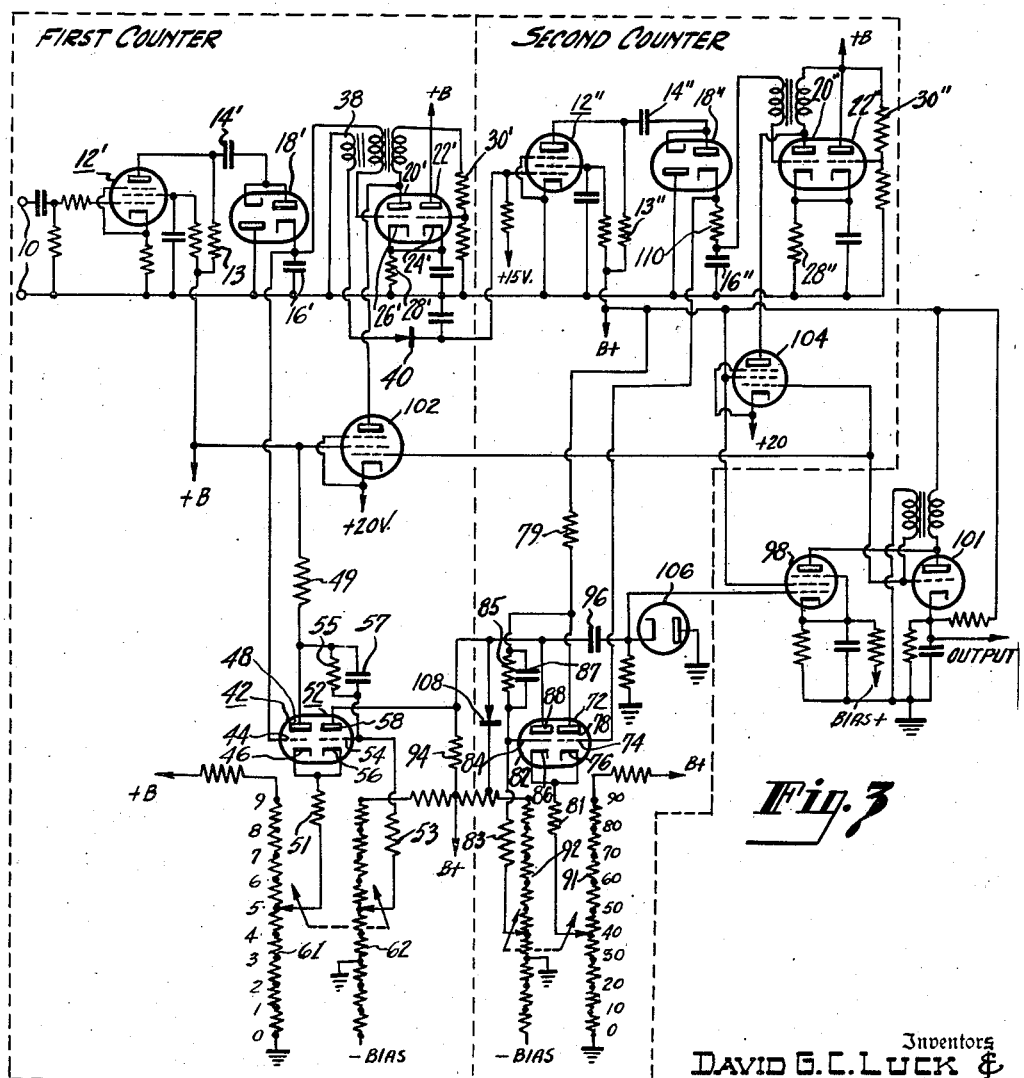
Inventors
DAVID G. C. LUCK &
CIRO C. MARTINELLI
BY
Attorney Patented Aug. 7, 1951

2,563,123

UNITED STATES PATENT OFFICE 2,563,123

COUNTER CIRCUIT

David G. C. Luck and Ciro C. Martinelli, Princeton, N. J., assignors to Radio Corporation of America, a corporation of Delaware Application February 24, 1950, Serial No. 146,116

13 Claims. (Cl. 250—27)

1

This invention relates to electronic counter circuits and more particularly is an improvement in electronic counter circuit systems of the energy storage step type.

In Patent No. 2,113,011, for "Thermionic Valve Apparatus," issued April 5, 1938, to E. L. C. White, is shown and described a basic energy storage step type of counter wherein pulses to be counted are applied to a storage capacitor through a diode to charge the capacitor up in steps. When a predetermined charge, corresponding to a predetermined count, has been accumulated on the capacitor a discharge device, such as a blocking oscillator, is tripped to provide an indication of the count and to discharge the capacitor to make it available for a new count.

This type of counter has not been used in counting systems to too great an extent because variations in power supply voltages result in changes in successive pulse amplitudes causing variations in the amount of charge stored on the storage capacitor for each pulse. Power supply variations also serve to shift the voltage required to trigger the blocking oscillator. Thus, the counter may become unstable and unreliable. A chain counter, of the energy step storage type, besides having the above noted objections, is also not too flexible. By the counter being flexible is meant its ability to provide an output for any desired count within its counting range. Such changes in count indication are made by changing the blocking oscillator triggering bias or by changing the amount of voltage applied to the storage condenser from each applied pulse. In either case, the range of possible counts obtainable is limited.

It is an object of the present invention to provide an improved energy step storage counter system which provides complete count flexibility within its counting range.

It is a further object of the present invention to provide an improved energy step storage counter system which is more stable than those of the prior art.

It is still a further object of the present invention to provide an improved energy step storage counter system which is more reliable than those of the prior art.

It is yet another object of the present invention to provide an improved energy step storage counter which is not adversely affected by voltage variations occurring in any of the circuit parameters.

These and other objects of the present invention are achieved by providing, for each counter in the chain, a pair of tubes, known as a sensing and a coincidence tube, having a common cathode bias resistor and a variable bias supply connected thereto. The grid of the sensing tube is connected to the associated counter storage condenser, another variable bias supply is connected to the grid of the coincidence tube. The amplitude of the variable bias supplies are determined so that the sensing tube connected to the storage condenser remains non-conductive and the coincidence tube remains conductive until a predetermined count, when the charge on the storage condenser causes the sensing tube to become conductive. The coincidence tube is thereupon rendered non-conductive. All of the coincidence tubes for the entire counting chain have a common anode load impedance. When there is coincidence in non-conduction of these tubes, which occurs upon conduction in all of the sensing tubes connected to the storage capacitors, the voltage at the common anode load impedance attains a value sufficient to trigger a blocking oscillator. The output pulse from this blocking oscillator is used to reset the counter and to indicate the attainment of the desired count.

Stability of the counter chain is assured by employing a limiter tube in each counter for the purpose of applying counting pulses to the storage capacitors. The limiter tube characteristics and load are then so selected that the limiter tube square wave output varies in the same ratio as the plate voltage variations. Further, the blocking oscillator tube in each counter and a cathode follower tube are connected to have the same cathode load resistor. Bias for the cathode follower is obtained from a voltage divider connected across the anode voltage supply. This insures that the pulse applied to the storage capacitor in each counter as well as the blocking oscillator triggering bias varies in accurate proportion with the anode supply voltage variations and thus stability of counting over a wide range of anode supply variations is assured.

The novel features of the invention as well as the invention itself, both as to its organization and method of operation, will best be understood from the following description, when read in connection with the accompanying drawings, in which, Figure 1 is a circuit diagram of a single counter stage embodying some of the novel features of the present invention, Figure 2 is a drawing of the plate characteristic curves of certain types of pentode electron discharge tubes, and Figure 3 is a circuit diagram of a counting chain illustrating a preferred embodiment of the invention.

Referring now to Figure 1, successive pulses to be counted are applied to the input terminals 10 of a single energy storage step type of counter. A limiter stage 12 is provided in order to obtain uniformity in the amplitude of the applied pulses. The limiter stage output is applied to charge up two condensers 14, 16 in series with each other through one section of a double diode 18. At the termination of each counting pulse, one of the condensers 14 discharges through the other half of the double diode 18, to which it is connected, and the other condenser 16 stores the portion of the charge it has received. This storage condenser 16 stores a charge from each applied counting pulse. The storage condenser is connected to the grid of a blocking oscillator tube 20. When the charge on the storage condenser has reached a sufficient amplitude it overcomes the bias of the blocking oscillator 20 and triggers it. The storage condenser is discharged through the grid-cathode path of the blocking oscillator 20 which is made conductive when the blocking oscillator is triggered.

As described thus far, the counter stage is typical of those known and used in the prior art. The voltage appearing across the storage capacitor for the first input pulse from the limiter stage is $$E_s \frac{C_1}{C_1+C_2}$$

where $E_s$ is the peak-to-peak voltage amplitude of the pulse applied to the two condensers 14, 16, $C_1$ is the first condenser 14 and $C_2$ is the storage condenser 16. For the second pulse the voltage charge is $$E_s \frac{C_1}{C_1+C_2}\left(1-\frac{C_1}{C_1+C_2}\right)$$

and for the $n$th voltage pulse the charge is $$E_s \frac{C_1}{C_1+C_2}\left(1-\frac{C_1}{C_1+C_2}\right)^{n-1}$$

It may therefore be seen that the voltage appearing across the storage capacitor 16 and also on the grid of the blocking oscillator 20 is dependent only upon the ratio of the two capacitors and on the amplitude of the applied pulse. Stable operation of the counter, against plate supply voltage changes, may be obtained if the threshold, or triggering voltage of the blocking oscillator, and the amplitude of the applied pulses are made to vary in exactly the same ratio with plate voltage variations.

To insure a threshold voltage supply for the blocking oscillator, which is economical in current requirements and has a low impedance, at least during the initial phase of blocking oscillator action, a cathode follower stage 22 is connected to the blocking oscillator. This consists of a vacuum tube having its cathode 24 connected to the cathode 26 of the blocking oscillator and to a common cathode load resistor 28 shunted by a bypass capacitor. An anode supply voltage divider 30 is provided which is connected across the anode power supply and is tapped to provide a grid bias for the cathode follower 22. The voltage divider 30 also, through the common cathode load resistor 28, determines the threshold or triggering bias applied to the blocking oscillator 20. With this arrangement the threshold setting of the blocking oscillator is made to vary in the same ratio as the supply voltage.

For complete stabilization, in addition to the above, the output of the limiter 12 should be made to vary in the same ratio as the plate supply variations. An examination of the plate characteristic curves of pentodes shows that certain pentodes have their plate current-plate voltage curves join the zero plate voltage-plate current curve in a straight line, which is common to all grid voltages, at low values of plate voltage. Figure 2 is representative of such a set of curves. A 6AU6 tube is an example of a pentode having characteristics of the type shown in Figure 2.

The limiter tube selected is a pentode preferably having characteristics exemplified by Figure 2. Its load line is then selected such that, for the maximum anode supply voltage to be used, the load line 32 intercepts the common straight portion of the plate current characteristic 34. Then the counting pulse output which is a square wave, varies in the same ratio as plate voltage variations. The load line slope determines the value of the anode load resistor 13, which is computed in the manner well known to the art. Referring to Fig. 2, $Ep_2$ is a maximum plate voltage and the load line 32 selected is shown as a solid line. $Ep_1$ represents a lower plate voltage to which the anode voltage supply may drop. The load line 32 for $Ep_1$, in view of the load resistor value selected, remains substantially parallel to the $Ep_2$ load line 36 and is shown as dotted. Therefore, $$\frac{Ep_1}{Ep_2}=\frac{Es_1}{Es_2}$$

where $Es_1$ and $Es_2$ are the peak-to-peak voltage amplitudes obtained with $Ep_1$ and $Ep_2$ respectively. This proportionality is not disturbed by screen grid voltage variations. Therefore, with the proper limiter tube 12 and limiter tube load resistor 13, and with a cathode follower 22 connected to the blocking oscillator 20, the counter is made stable over wide limits of voltage plate supply changes.

Referring now to Figure 3, two of the counters shown in Figure 1 are shown chain or cascade connected. The blocking oscillator threshold bias of each counter is set so that the blocking oscillator in each counter is normally triggered when ten pulses have been applied to each counter input. The output pulse from the first counter is applied to the second counter (1) through an additional winding 38 coupled to the blocking oscillator transformer, and (2) through the rectifier 40 to the grid of the limiter tube of the second counter. Thus an output pulse may be obtained from the second counter when one hundred successive pulses have been applied to the first counter. Elements of the first and second counter in the chain which function in similar fashion to the components of the counter shown in Figure 1 are identified with the same numerals primed and double-primed.

The grid 44 of one triode 42 of a pair of cathode connected triodes 42, 52 is connected to the storage capacitor 16' of the first counter in the cascade. In view of the common cathode connected load resistor 51, the voltage changes on the storage capacitor 16' cause corresponding voltage changes at the cathodes 46, 56 of the two triodes 42, 52. The common cathode load resistor 51 is connected to an adjustable voltage divider 61 connected across a voltage source. This may be considered an adjustable bias. The grid 54 of the other triode 52 of the pair of cathode connected triodes is also connected through a grid resistor 53 to an adjustable voltage divider 62 connected across a source of voltage. The two adjustable biases 61, 62 are ganged so that they are simultaneously adjustable. The biases are adjusted so that the one triode 42 or sensing tube is non-conductive and the other triode 52 or coincidence tube is conductive until a desired count or number of pulses has been impressed upon the first counter at which time the charge on the storage capacitor 16' overcomes the bias preventing the sensing tube 42 from conducting. Tube 42 then becomes conductive and the cathode applied bias thereupon renders the coincidence tube 52 non-conducting. The ganged adjustable biases 61, 62 may be adjusted so that any count up to ten may be selected to switch conduction from the coincidence to the sensing tube.

Sensing and coincidence cathode coupled tubes 72, 82 are also provided for the second counter in the cascade. These sensing and coincidence tubes 72, 82 are similarly interconnected and coupled to two ganged adjustable biases 91, 92 and the grid 74 of the sensing tube is also connected to the second counter storage capacitor 16". Therefore, switching in conduction from the sensing tube 72 to the coincidence tube 82 is available for any desired count up to 100 by variation of the ganged adjustable biases 91, 92.

A resistor 94 serves as a common anode load for both coincidence tubes 52, 82. Any output occurring at the common anode load resistor 94 is coupled through a condenser 96 to the grid of a gating tube 98 which is coupled to a blocking oscillator 101. Both an output pulse and a reset pulse are derived from the blocking oscillator 101. The reset pulse is coupled to the grids of a pair of amplifier tubes, 102, 104, the output from each of which is respectively coupled to the blocking oscillators 20', 20" of the first and second counters.

With the adjustable biases 61, 62, 91, 92 set for a count of 45 as indicated in Figure 3, operation of the counter chain is as follows. Initially, the coincidence tube grids 54, 84 are more positive and as a result these tubes are conductive. The sensing tubes 42, 72 are non-conductive, in view of the bias applied through their respective cathodes 46, 76, and caused by conduction of the respective coincidence tubes 52, 82. Upon application of a fifth input pulse to the first counter, the charge on the storage capacitor 16' becomes large enough to cause the sensing tube 42 for the first counter to become conductive. The associated coincidence tube 52 becomes non-conductive, due to the applied cathode bias overcoming its positive grid bias. However, since the coincidence tube 82 associated with the second counter is still conducting, there is an insufficient rise in voltage at the plate side of the common load resistor 94 to open the gating tube 98.

At the occurrence of the fortieth pulse, conduction between the coincidence tube 82 and the sensing tube 72 assocated with the second counter is interchanged. However, conduction is restored to the coincidence tube 52 associated with the first counter each time the first counter goes through a cycle of ten input pulses. Therefore, there is still an insufficient rise in voltage at the plate end of the common load resistor 94 to open the gating tube 98. At the occurrence of the fifth pulse following the fortieth pulse, or the forty-fifth pulse, both sensing tubes 42, 72 are conducting simultaneously, both coincidence tubes 52, 82 are non-conducting, the rise in voltage from the common anode load resistor 94 is sufficient to open the gate tube 98 which draws current and thus triggers the blocking oscillator 101. The pulse which is thus generated is amplified by amplifiers 102, 104 and applied to both counter blocking oscillators 20', 20" to trigger them and discharge the storage capacitors 16', 16". The counter thus counts to forty-five, supplies an output pulse, and is reset. Similarly, any desired count up to 100 may be obtained. Instead of counting up, in well-known manner, the counter may be used as a frequency divider to provide an output which is any desired fraction of the input frequency down to one one-hundredth.

Considering the gating tube 98, a suitable bias applied to its cathode maintains it at cutoff until a pulse of sufficient amplitude is applied to its grid to render it conductive. The diode 106 coupled to the grid of the gating tube maintains the operating point of the grid essentially fixed even though the repetition rates of the coincident pulses may vary widely with a resultant shift in the A. C. axis of the pulses applied through the condenser 96. A rectifier 108 is connected across the common plate load resistor 94 to a point on the voltage divider 92 to be biased so that signals of negative polarity greater than a predetermined amplitude are bypassed and do not appear across the load resistor 94.

In order to assure coincidence between counters, a compensating resistor 110 is placed in series with the storage capacitor 16". This resistor value is selected to be in the same ratio to its associated limiter plate resistor 13" as the ratio of the storage capacitors 16', 16" of the two counters. A requirement for accurate counter coincidence is that the rise time of the voltage for all the storage capacitors in the counter chain is substantially the same. This is difficult to achieve since storage capacitors may vary from 500 μμfd. to 50,000 μμfd., depending on the frequency at which the particular counter stage operates. The compensating resistor value is selected so that all the storage capacitor time constants or charging rates are equalized, thus assuring coincidence.

Considering the action of the sensing and coincidence tubes it is evident that current must switch from one triode to the other within the amplitude of one step of voltage applied to a storage capacitor. Practical design limitations will usually limit the voltage per step to the order of 7 to 10 volts maximum. Thus the sensing and coincidence tubes must have abrupt or short cut-off characteristics and preferably low plate resistance. Ideal tubes for this purpose are not readily available. However, considerable improvement in operation of the sensing and coincidence circuits results if a regenerative type of connection is made. This consists of using resistor 49 in the plate circuit of the sensing tube 42 and a resistor 55 and condenser 57 which are connected in parallel with each other and which D. C. couple any output voltage across this resistor 49 to the grid 54 of the coincidence tube 52. Similarly, an anode load resistor 79 is provided for sensing tube 72 and a parallel connected resistor 85 and condenser 87 couple the sensing tube anode 78 to the coincidence tube grid 84. Since bias source 62 is usually a moderately low resistance, a series grid resistor 63 must be inserted between grid 54 and the tap for bias source 62. Similarly a series grid resistor 83 must be inserted between grid 84 and the tap for bias source 92. In view of the D. C. coupling of the two coincidence tube grids, for those counts where the voltage on either of the grids 54 or 84 must be at some voltage less than that applied from the anodes of the sensing tubes through the coupling resistors 55, 85, the bias sources 62 and 92 are returned to sources of negative bias.

As a sensing tube begins to conduct, the negative voltage developed at its anode load resistor, by reason of the D. C. coupling, is applied to the associated coincidence tube grid to hasten the tube to cut-off. Thus the coincidence tube is caused to go to cut-off with a much smaller change in the voltage applied to the grid of the sensing tube. This type of action permits the use of high transconductance, low plate resistance tubes even though their cut-off characteristics may be rather long. This also improves the speed of action, resulting in extended frequency characteristics of the sensing and coincidence circuits.

Although, by way of example, only two counter stages have been shown, this is not to be taken as a limitation, since it will be readily recognized that as many counters as are desired may be connected in the chain. Using the same anode load resistor and coincidence and sensing circuits as hereinabove explained, and shown, these counters may be used to count to any desired number or divide any frequency down to any desired lower frequency. Furthermore, if desired, a number of counter chains connected in cascade may be used with the gating tubes from each chain being connected to have a single anode load whereby coincidence in conduction in all the gating tubes may be used to generate an output and a reset pulse for any desired purpose.

From the foregoing description, it will be readily apparent that an improved electronic counter system is provided which enables complete count flexibility within its counting range and which is more stable and reliable than previous types of electronic energy storage step counter systems. It should be apparent that many changes may be made in the embodiment of the invention herein disclosed and that many other embodiments are possible, all within the spirit and scope of the invention. It is therefore desired that the foregoing description shall be taken as illustrative and not as limiting.

What is claimed is:

1. An electronic counter circuit comprising a chain of energy storage step counters, each counter including a storage capacitor that is charged up in steps in response to the application of successive pulses, adjustable means coupled to each of said counters to detect the arrival of each of said counters at a predetermined count, means responsive to a coincidence in detection by all said adjustable detecting means to generate a reset pulse, and means to apply said pulse to each of said counters to reset them to their initial position.

2. An electronic counter circuit as recited in claim 1 wherein each counter of said chain of energy storage step counters also includes a compensating resistor connected in series with said storage capacitor, the resistance value of each of said compensating resistors in each of said counters being selected to equalize the rise time of charging voltages applied to each of said storage capacitors.

3. An electronic counter circuit comprising a chain of energy storage step counters, each counter including a storage capacitor that is charged up in steps in response to the application of successive pulses being counted, a plurality of electron discharge tubes each having two conditions of conduction, a plurality of bias means, each of said bias means being coupled to each of said electron discharge tubes to cause it to assume a first condition of conduction, means coupling each of said storage capacitors to each of said electron discharge tubes to apply charges accumulated on said capacitors to said electron tubes in opposition to said bias means, means to adjust each of said bias means to a value at which the opposing charge on each capacitor at a predetermined count causes the associated electron discharge tube to assume its second condition of conduction, and means responsive to coincidence in arrival of all of said electron discharge tubes at a second condition of conduction to generate an output pulse.

4. An electronic counter circuit comprising a chain of energy storage step counters, each counter including a storage capacitor that is charged up in steps in response to the application of successive pulses being counted, an electron discharge tube for each counter, each tube having at least an anode, a cathode and a control grid, each of said control grids being coupled to each of said storage capacitors, an adjustable bias means for each of said electron discharge tubes, each of said adjustable bias means being coupled to the cathode of each of said tubes and being adjustable to maintain the tube to which it is coupled substantially non-conducting until the associated storage capacitor is charged up by the application of a predetermined number of pulses to render said tube conducting, means responsive to coincidence in conduction of all of said electron discharge tubes to generate a pulse and means to apply said pulse to said counters as a reset pulse.

5. An electronic counter circuit as recited in claim 4 wherein each counter of said chain of energy storage step counters also includes a compensating resistor connected in series with said storage capacitor, the resistance value of each of said compensating resistors in each of said counters being selected to equalize the rise time of charging voltages applied to each of said storage capacitors.

6. An electronic counter circuit comprising a chain of energy storage step counters, each counter including a storage capacitor that is charged up in steps in response to the application of successive pulses being counted, a first and second electron discharge tube for each counter, each of said tubes having an anode, cathode and control grid, a cathode bias resistor for each of said first and second tubes, each of said first and second tube cathodes being connected together and to one end of said cathode bias resistor, a first adjustable bias means for each of said first tubes, each of said first adjustable bias means being connected to the other end of each of said cathode bias resistors, a second adjustable bias means for each of said second tubes, each of said second adjustable bias means being connected to a respective second tube grid, each of said first tube grids being coupled to a respective one of said storage capacitors, each of said first adjustable bias means being adjustable to maintain said first tube to which it is coupled substantially non-conducting until the associated storage capacitor is charged up by the application of a predetermined number of pulses to render said first tube conducting, each of said second adjustable bias means being adjustable to maintain said second tube to which it is coupled conducting when said first tube is not conducting and to permit said second tube to become substantially non-conducting when said cathode connected first tube becomes conducting, means coupled to all said second tubes responsive to a coincidence in non-conduction in all said second tubes to generate a pulse and means to apply said pulse to said counters as a reset pulse.

7. An electron counter circuit as recited in claim 6 wherein said means responsive to a coincidence in non-conduction in all said second tubes to generate a pulse includes a common load resistor connected to all said second tubes, and a blocking oscillator coupled to said common load resistor to be triggered when the current drawn through said common load resistor by said second tubes is a minimum.

8. An electron counter circuit as recited in claim 6 wherein each of said energy storage step counters includes a blocking oscillator comprising an electron discharge tube having anode, cathode and grid electrodes, a cathode follower tube having anode, cathode and grid electrodes, a cathode bias resistor, said blocking oscillator cathode and cathode follower tube cathode being connected together and to said cathode bias resistor, and means to apply a bias to said cathode follower grid to compensate the threshold bias applied to said blocking oscillator for variations in anode supply voltage.

9. The combination with an energy storage step counter having a storage capacitor that is charged up in steps in response to the application of successive pulses to trigger a blocking oscillator upon the application of a predetermined number of said pulses, of means to stabilize said counter for power supply variations comprising an input limiter tube to apply said successive pulses to said storage capacitor, said input limiter tube being selected to be of the type wherein its plate current-plate voltage characteristic curves join its zero curve in a substantially straight line at low values of anode voltage, a load resistor for said limiter tube, said load resistor value being selected to position said limiter tube load line to intersect said zero curve at a straight line portion thereof for the maximum anode voltage supply used, a cathode follower tube, a common cathode bias load for said cathode follower tube and said blocking oscillator and a voltage divider for connection across said power supply, said cathode follower being coupled to said voltage divider to derive a bias therefrom to compensate the threshold bias applied to said blocking oscillator for variations in power supply voltage.

10. An electronic counter circuit comprising in combination, a chain of energy storage step counters, each counter including an input limiter tube to which successive pulses to be counted are applied, said input limiter tube being selected to be of the type wherein its plate current-plate voltage characteristic curves join its zero curve in a substantially straight line at low values of anode voltage, a load resistor for said limiter tube, said load resistor value being selected to position said limiter tube load line to intersect said zero curve at a straight line portion thereof for the maximum anode voltage supply used, a storage capacitor to which said limiter tube output is coupled to charge said capacitor up in steps, a blocking oscillator, said blocking oscillator being coupled to said storage capacitor to be triggered by an accumulation of charges thereon at a predetermined count, a cathode follower tube, a common cathode bias load for said cathode follower tube and said blocking oscillator, and an anode supply voltage divider, said cathode follower being coupled to said anode supply voltage divider to derive a bias therefrom, an electron discharge tube for each counter, each of said electron discharge tubes having at least an anode, a cathode and a control grid, each of said control grids being coupled to each of said storage capacitors, an adjustable bias means for each of said electron discharge tubes, each of said adjustable bias means being coupled to the cathode of each of said tubes and being adjustable to maintain the tube to which it is coupled substantially non-conducting until the storage capacitor to which said tube is coupled is charged up by the application of a predetermined number of pulses to render said tube conducting, means responsive to coincidence in conduction of all of said electron discharge tubes to generate a pulse and means to apply said pulse to said counters as a reset pulse.

11. The combination recited in claim 10 wherein in each of said energy step storage counters the rise time of the voltage applied to charge each of said storage capacitors is equalized by a compensating resistor connected in series with said storage capacitor, the value of each of said compensating resistors being in the same ratio to its respective limiter load resistor as the ratio of the storage capacitor to which the compensating resistor is connected, to the storage capacitor whose rise time it is desired to equal.

12. An electronic counter circuit comprising in combination, a chain of energy storage step counters, each counter including an input limiter tube to which successive pulses to be counted are applied, said input limiter tube being selected to be of the type wherein its plate current-plate voltage characteristic curves join its zero curve in a substantially straight line at low values of anode voltage, a load resistor for said limiter tube, said load resistor value being selected to position said limiter tube load line to intersect said zero curve at a straight line portion thereof for the maximum anode voltage supply used, a storage capacitor to which said limiter tube output is coupled to charge said capacitor up in steps, a blocking oscillator, said blocking oscillator being coupled to said storage capacitor to be triggered by an accumulation of charges thereon at a predetermined count, a cathode follower tube, a common cathode bias load for said cathode follower tube and said blocking oscillator, and an anode supply voltage divider, said cathode follower being coupled to said anode supply voltage divider to derive a bias therefrom, a first and second electron discharge tube for each counter, each of said tubes having an anode, cathode and control grid, a cathode bias resistor for each of said first and second tubes, each of said first and second tube cathodes being connected together and to one end of said cathode bias resistor, a first adjustable bias means for each of said first tubes, each of said first adjustable bias means being connected to the other end of each of said cathode bias resistors, a second adjustable bias means for each of said second tubes, each of said second adjustable bias means being connected to a respective second tube grid, each of said first tube grids being coupled to a respective one of said storage capacitors, each of said first adjustable bias means being adjustable to maintain said first tube to which it is coupled substantially non-conducting until the associated storage capacitor is charged up by the application of a predetermined number of pulses to render said first tube conducting, each of said second adjustable bias means being adjustable to maintain said second tube to which it is coupled conducting when said first tube is not conducting and to permit said second tube to become substantially non-conducting when said cathode connected first tube becomes conducting, means coupled to all said second tubes responsive to a coincidence in non-conduction in all said second tubes to generate a pulse and means to apply said pulse to said counters as a reset pulse.

13. An electron counter circuit as recited in claim 12 wherein each of said first electron discharge tube anodes is D. C. coupled to an associated second electron discharge tube control grid.

DAVID G. C. LUCK.
CIRO C. MARTINELLI.

REFERENCES CITED

The following references are of record in the file of this patent:

UNITED STATES PATENTS

| Number | Name | Date |
|---|---|---|
| 2,418,521 | Morton et al. | Apr. 8, 1947 |
| 2,443,198 | Sallach | June 15, 1948 |